(12) United States Patent
Ma

(10) Patent No.: US 11,061,122 B2
(45) Date of Patent: Jul. 13, 2021

(54) HIGH-DEFINITION MAP ACQUISITION SYSTEM

(71) Applicant: BEIJING DIDI INFINITY TECHNOLOGY AND DEVELOPMENT CO., LTD., Beijing (CN)

(72) Inventor: Teng Ma, Beijing (CN)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 111 days.

(21) Appl. No.: 16/236,417

(22) Filed: Dec. 29, 2018

(65) Prior Publication Data

US 2019/0392232 A1 Dec. 26, 2019

Related U.S. Application Data

(63) Continuation of application No. PCT/CN2018/092668, filed on Jun. 25, 2018.

(51) Int. Cl.
*G06K 9/00* (2006.01)
*G01S 7/497* (2006.01)
(Continued)

(52) U.S. Cl.
CPC .......... *G01S 7/4972* (2013.01); *G01S 17/42* (2013.01); *G01S 17/89* (2013.01); *G06F 16/29* (2019.01);
(Continued)

(58) Field of Classification Search
CPC .......... G06K 9/00825; G06K 9/00805; G06K 9/4628; G06K 9/6274; H04N 5/2253;
(Continued)

(56) References Cited

U.S. PATENT DOCUMENTS 6,762,790 B1 7/2004 Matko et al.
6,810,330 B2 * 10/2004 Matsuura ............... G01S 17/42
701/301

(Continued)

FOREIGN PATENT DOCUMENTS

CN 106394555 A 2/2017
CN 107430195 A 12/2017
(Continued)

OTHER PUBLICATIONS

International Search Report in PCT/CN2018/092668 dated Mar. 29, 2019, 5 Pages.
(Continued)

*Primary Examiner* — Samir A Ahmed
(74) *Attorney, Agent, or Firm* — Bayes PLLC

(57) ABSTRACT

Embodiments of the disclosure provide methods and systems for acquiring map data. The system may include a mounting structure configured to adjustably mount a sensor to a vehicle. The sensor may be configured to capture data indicative of at least one surrounding object as the vehicle travels along a path. The system may further include a controller configured to dynamically determine a mounting angle based on the captured data, and cause the mounting structure to adjust the sensor according to the dynamically determined mounting angle.

17 Claims, 6 Drawing Sheets

(51) Int. Cl.
*G06F 16/29* (2019.01)
*H04N 5/225* (2006.01)
*G01S 17/89* (2020.01)
*G01S 17/42* (2006.01)

(52) U.S. Cl.
CPC ....... *G06K 9/00825* (2013.01); *H04N 5/2253* (2013.01)

(58) Field of Classification Search
CPC .. H04N 5/2257; H04N 5/23299; G01S 17/89; G01S 17/42; G01S 7/4972; G01S 7/4813; G01S 17/931
See application file for complete search history.

(56) References Cited

U.S. PATENT DOCUMENTS

| | | | |
|---|---|---|---|
| 8,996,172 | B2 | 3/2015 | Shah et al. |
| 9,121,703 | B1* | 9/2015 | Droz ................... G01S 7/484 |
| 9,254,846 | B2 | 2/2016 | Dolgov et al. |
| 9,880,263 | B2* | 1/2018 | Droz ................... G01S 17/86 |
| 2003/0028291 | A1 | 2/2003 | Matsuura |
| 2015/0355333 | A1 | 12/2015 | Ono et al. |
| 2015/0362587 | A1* | 12/2015 | Rogan ................. G01S 7/4972 702/104 |
| 2016/0291134 | A1 | 10/2016 | Droz et al. |
| 2017/0176597 | A1 | 6/2017 | Gruver et al. |
| 2017/0219713 | A1 | 8/2017 | Gruver |
| 2018/0017680 | A1 | 1/2018 | Pennecot et al. |
| 2018/0143324 | A1 | 5/2018 | Keilaf et al. |
| 2018/0164439 | A1 | 6/2018 | Droz et al. |

FOREIGN PATENT DOCUMENTS

| | | |
|---|---|---|
| CN | 107728646 A | 2/2018 |
| CN | 207045253 U | 2/2018 |
| CN | 108139465 A | 6/2018 |
| CN | 207455096 U | 6/2018 |
| EP | 1103823 A2 | 5/2001 |
| EP | 1103823 A3 | 5/2002 |
| JP | 2011123551 A | 6/2011 |
| JP | 2015230551 A | 12/2015 |
| JP | 2018049014 A | 3/2018 |
| JP | 2018139084 A | 9/2018 |
| JP | 2018180181 A | 11/2018 |
| KR | 20150047215 A | 5/2015 |
| WO | 2015/088396 A1 | 6/2015 |
| WO | 2015088396 A1 | 6/2015 |

OTHER PUBLICATIONS

Written Opinion in PCT/CN2016/092666 dated Mar. 29, 2019, 4 Pages.
TMTJ, You See the Google Virtual Car or Shunting Garmin Road, 2010, 17 pages.
The Office Action in Canadian Application No. 3028288 dated Jan. 2, 2020, 5 pages.
The Extended European Search Report in European Application No. 18815926.3 dated Sep. 26, 2019, 8 pages.
First Examination Report in Australian Application No. 2018286580 dated Oct. 16, 2019, 5 pages.
"Lidar", Web page <https://web.archive.org/web/20180516164645/https:/en.wikipedia.org/wiki/Lidar>, May 14, 2018.
The Third Examination Report in Australian Patent Application No. 2018286580 dated Sep. 3, 2020, 5 pages.
First Examination Report in Indian Application No. 201817049153 dated Jul. 10, 2020, 6 pages.
Second Office action issued in Canadian Patent Application No. 3,028,288, dated Dec. 9, 2020, 4 pages.
Lidar [retrieved from internet on Dec. 2, 2020] <URL: https://web.archive.org/web/20171030101708/https://en.wikipedia.org/wiki/Lidar> published Oct. 30, 2017 as per Wayback Machine, 14 pages.
Notice of Acceptance for Patent Application issued in corresponding Australian Application No. 2018286580, dated Oct. 2, 2020, 3 pages.
Third Office action issued in corresponding Taiwan Application No. (02) 223767370, dated Mar. 23, 2021, 5 pages.
"Are you seeing a real Google car or a Garmin road shunting", https://www.techbang.com/posts/2173-you-see-thegoogle-virtual-car-or-shunting-garmin-road, downloaded on Apr. 8, 2021, 13 pages.
Decision to Grant Patent issued in corresponding Japanese Application No. 2018-567727, dated May 11, 2021, 6 pages.

* cited by examiner

410

420

500

HIGH-DEFINITION MAP ACQUISITION SYSTEM

CROSS-REFERENCE TO RELATED APPLICATIONS

This application is a continuation of International Application No. PCT/CN2018/092668, filed on Jun. 25, 2018, designating the United States of America, the contents of which are hereby incorporated by reference.

TECHNICAL FIELD

The present disclosure relates to a high-definition map acquisition system, and more particularly to, a high-definition map acquisition system that dynamically adjusts the mounting angle of a Light Detection And Ranging (LiDAR) used to acquire map data.

BACKGROUND

Autonomous driving technology relies heavily on an accurate map. For example, accuracy of the navigation map is critical to functions of autonomous driving vehicles, such as positioning, ambience recognition, decision making and control. High-definition maps may be obtained by aggregating images and information acquired by various sensors, detectors, and other devices on vehicles as they drive around. For example, a vehicle may be equipped with one or more sensors such as a LiDAR or a high-definition camera, to capture features of the road the vehicle is driving on or surrounding objects. Data captured may include, e.g., center line or border line coordinates of a lane, coordinates and images of an object, such as a building, another vehicle, a landmark, a pedestrian, or a traffic sign.

The sensors are typically mounted on the body, such as the top, of the vehicle. The angle between the sensor orientation and the vehicle surface is known as a mounting angle. Existing mounting methods use fixed mounting angles. For example, in a horizontal mounting, the sensor is oriented parallel to the vehicle top surface (i.e., 0 degree mounting angle) such that the sensor points at a scene at the same height of the sensor. At that height, the sensor typically captures objects like other vehicles, lower parts of buildings, house, trees, and pedestrians. As another example, in a tilted mounting, the sensor is oriented at an angle with the vehicle top surface (i.e., mounting angle >0 degree). The sensor may point down to capture features of the road, such as lanes, turning signs, curbs, etc. The sensor may also point up to capture traffic lights, traffic signs, tree tops, and higher parts of buildings. However, at a fixed mounting angle, the sensor can only capture a region of interest at a fix height, and therefore, does not always capture the scene that contains most valuable map data needed for later constructing the high-definition map. Therefore, an improved system and method for acquiring map data is needed.

Embodiments of the disclosure address the above problem by methods and systems for dynamically adjusting the sensor mounting angle to acquire high-definition map data.

SUMMARY

Embodiments of the disclosure provide a system for acquiring map data. The system may include a mounting structure configured to adjustably mount a sensor to a vehicle. The sensor may be configured to capture data indicative of at least one surrounding object as the vehicle travels along a path. The system may further include a controller configured to dynamically determine a mounting angle based on the captured data, and cause the mounting structure to adjust the sensor according to the dynamically determined mounting angle.

Embodiments of the disclosure further disclose a method for acquiring map data. The method may include capturing data indicative of at least one surrounding object using a sensor adjustably mounted on a vehicle, as the vehicle travels along a path. The method may further include dynamically determining, by a controller, a mounting angle based on the captured data. The method may also include adjusting the sensor according to the dynamically determined mounting angle.

Embodiments of the disclosure further disclose a vehicle. The vehicle may include at least one wheel and a body carried by the at least one wheel. The vehicle may further include a sensor configured to capture data indicative of at least one surrounding object as the vehicle travels along a path. The vehicle may yet further include a mounting structure configured to adjustably mount the sensor to the body. The vehicle may further include a controller configured to dynamically determine a mounting angle based on the captured data, and cause the mounting structure to adjust the sensor according to the dynamically determined mounting angle.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
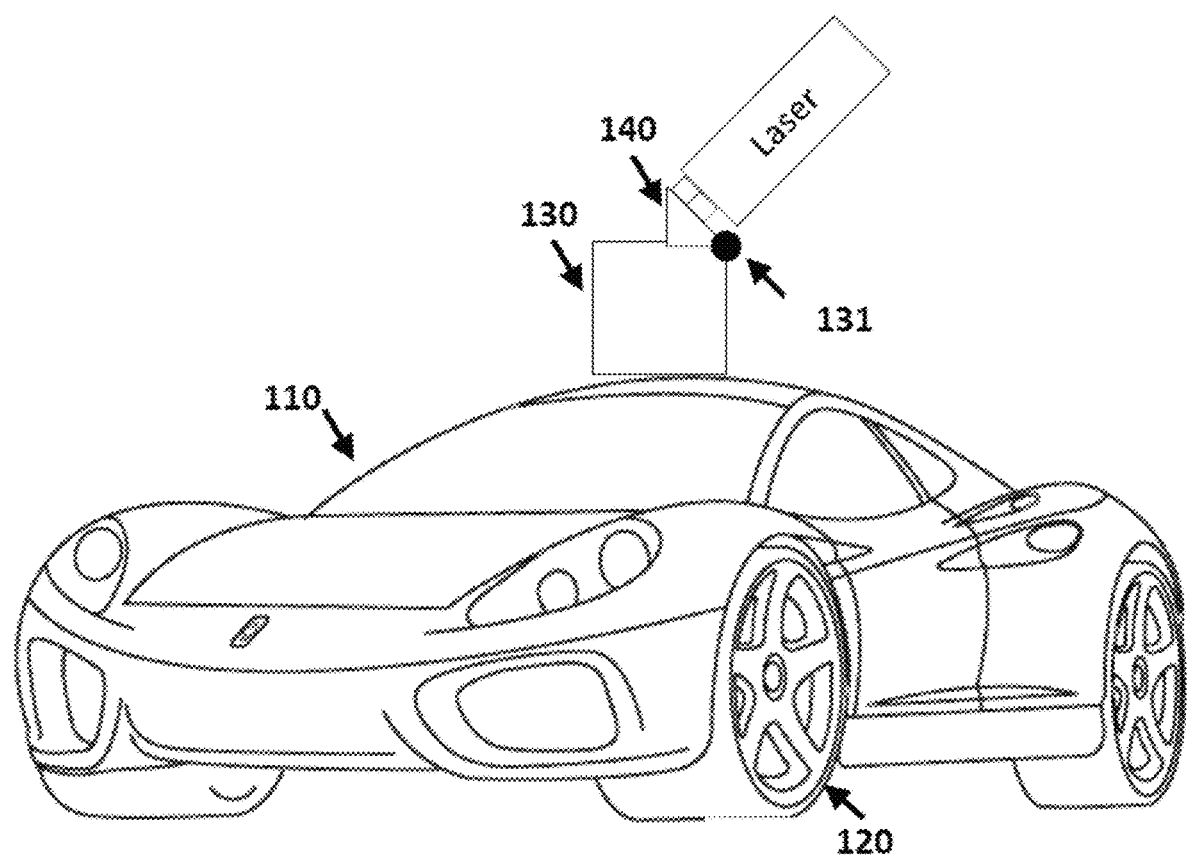
FIG. 1 illustrates a schematic diagram of an exemplary vehicle having a sensor adjustably mounted thereon, according to embodiments of the disclosure.

FIG. 1 illustrates a schematic diagram of an exemplary vehicle 100 having a sensor 140 adjustably mounted thereon, according to embodiments of the disclosure. Consistent with some embodiments, vehicle 100 may be a survey vehicle configured for acquiring data for constructing a high-definition map. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with sensor 140 mounted to body 110 via a mounting structure 130. Consistent with some embodiments, sensor 140 may be configured to capture data as vehicle 100 travels along a path. For example, sensor 140 may be a camera that takes pictures or otherwise collects image data. As another example, sensor 140 may be a LiDAR configured to scan the surrounding and acquire point clouds. LiDAR measures distance to a target by illuminating the target with pulsed laser light and measuring the reflected pulses with a sensor. Differences in laser return times and wavelengths can then be used to make digital three-dimensional (3-D) representations of the target. The light used for LiDAR scan may be ultraviolet, visible, or near infrared. Because a narrow laser beam can map physical features with very high resolution, LiDAR is particularly suitable for high-definition map surveys. In some embodiments, a LiDAR may capture a point cloud. As vehicle 100 travels along the path, sensor 140 may continuously capture data. Each set of scene data captured at a certain time point is known as a data frame.

In some embodiments, sensor 140 may include a combination of LiDAR and 3-D camera. As vehicle 100 travels along a path, both digital images and point clouds are acquired. The point clouds acquired from the LiDAR can be later matched with digital images taken of the scanned area from the scanner's location to create realistic looking 3-D models. For example, each point in the point cloud may be given the color of the pixel from the image taken located at the same angle as the laser beam that created the point.

Consistent with the present disclosure, mounting structure 130 may be an electro-mechanical device installed or otherwise attached to body 110 of vehicle 100. Mounting structure 130 may include various components (not illustrated in FIG. 1). For example, mounting structure 130 may include one mounting end for attaching itself to body 110, as well as another mounting end for mounting sensor 140. In some embodiments, mounting structure 130 may use screws, adhesives, or another mounting mechanism.

Consistent with the present disclosure, sensor 140 may be adjustably mounted to mounting structure 130, so that sensor 140 may turn, slide, elevate or otherwise move. In some embodiments, mounting structure 130 may include a pivot 131 for adjusting the mounting angle of sensor 140. Pivot 131 may include any pivoting component or use any suitable pivoting mechanism. For example, pivot 131 may include a shaft, a hinge, or a pin on which sensor 140 turns to increase or decrease the mounting angle. As sensor 140 turns, the direction of the laser beam changes to focus on a different field of view. Mounting structure 130 may additionally include an actuator such as a motor drive (not illustrated in FIG. 1) to actuate the pivot such that to adjust sensor 140.

Figure 2:
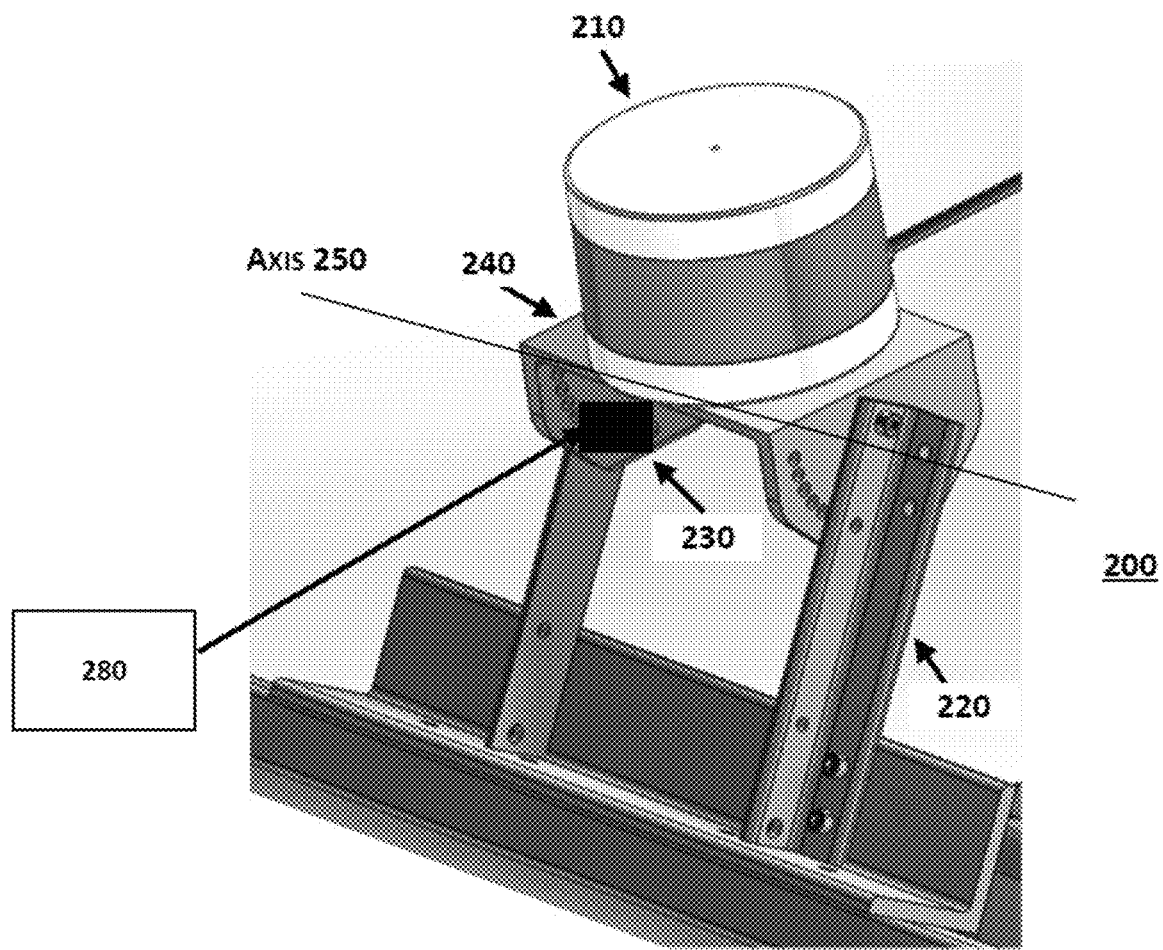
FIG. 2 illustrates a schematic diagram of an exemplary sensor mount, according to embodiments of the disclosure.

FIG. 2 illustrates a schematic diagram of an exemplary sensor mount 200, according to embodiments of the disclosure. Sensor mount 200 may be installed on body 110 of vehicle 100, and adjustably hold a LiDAR 210. As shown in FIG. 2, sensor mount 200 may include a stand 220 for supporting LiDAR 210. Stand 220 may extend vertically to elevate LiDAR 210 to a desired position. A pivoting component 240 may be adjustably attached to the end of stand 220, and LiDAR 210 may be mounted to the top surface of pivoting component 240. Pivoting structure may turn around an axis 250 and thus turning LiDAR 210 to point up, horizontally, or down. Sensor mount 200 may further include an actuator 230 controlled remotely by a controller 280. Controller 280 may communicate with actuator 230 via a wire or wirelessly. Actuator 230 may include a motor drive to drive pivoting component 240 to turn. It is contemplated that sensor mount 200 is only illustrative and constitutes one embodiment of mounting structure 130.

Figure 3:
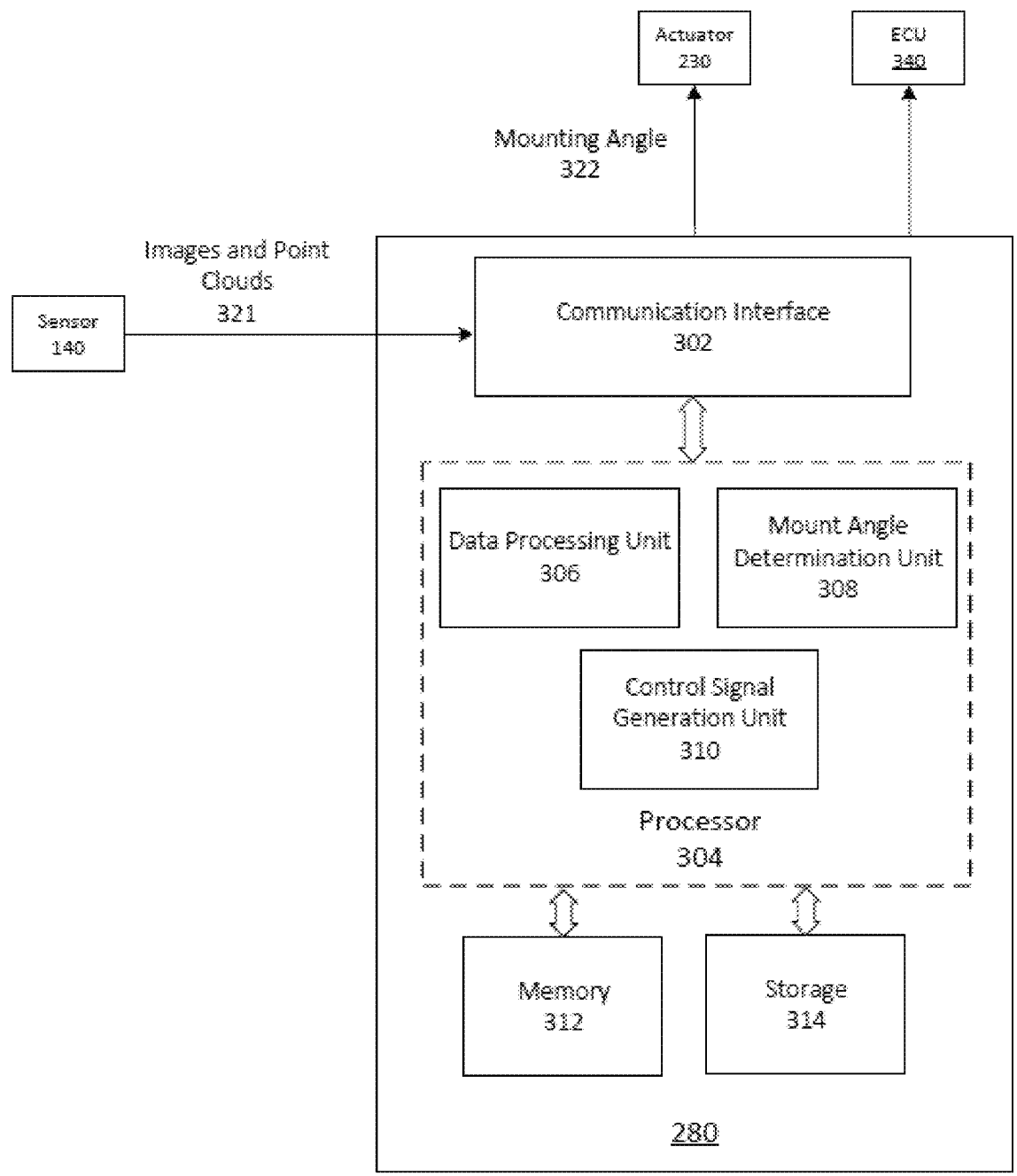
FIG. 3 illustrates a block diagram of an exemplary controller for adjusting the sensor, according to embodiments of the disclosure.

FIG. 3 illustrates a block diagram of an exemplary controller 280 for adjusting sensor 140, according to embodiments of the disclosure. Consistent with the present disclosure, the mounting angle of sensor 140 may be dynamically changed based on the data captured by sensor 140. In some embodiments, as shown in FIG. 3, controller 280 may include a communication interface 302, a processor 304, a memory 312, and a storage 314. In some embodiments, controller 280 may have different modules in a single device, such as processor 304 (implemented as an application-specific integrated circuit (ASIC) or a field-programmable gate array (FPGA), or separated devices with dedicated functions. In some embodiments, one or more components of controller 280 may be located inside vehicle 100, as shown, or may be alternatively in a mobile device, in the cloud, or another remote location. Components of controller 280 may be in an integrated device, or distributed at different locations but communicate with each other through a network (not shown). For example, processor 304 may, be a processor on-board vehicle 100, a processor inside a mobile device, or a cloud processor, or any combinations thereof.

Communication interface 302 may send data to and receive data from components such as sensor 140, and actuator 230 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments of the present disclosure, communication interface 302 may receive data captured by sensor 140, such as digital images and point cloud data 321, and provide the received data to storage 314 for storage or to processor 304 for processing. Communication interface 302 may also receive control signals generated by processor 304, and provide the control signal to actuator 230, which will adjust the mounting angle of sensor 140 accordingly.

Processor 304 may include any appropriate type of general-purpose or special-purpose microprocessor, digital signal processor, or microcontroller. Processor 304 may be configured as a separate processor module dedicated to acquiring map data as vehicle 100 travels along a path.

Alternatively, processor 304 may be configured as a shared processor module for performing other functions unrelated to acquiring map data.

As shown in FIG. 3, processor 304 may include multiple modules, such as a data processing unit 306, a mounting angle determination unit 308, a control signal generation unit 310, and the like. These modules (and any corresponding sub-modules or sub-units) can be hardware units (e.g., portions of an integrated circuit) of processor 304 designed for use with other components or to execute a part of a program. The program may be stored on a computer-readable medium, and when executed by processor 304, it may perform one or more functions. Although FIG. 3 shows units 306-310 all within one processor 304, it is contemplated that these units may be distributed among multiple processors located near or remotely with each other.

Figure 4:
FIG. 4 illustrates detecting objects based on an exemplary image, according to embodiments of the disclosure.
Figure 4:

Data processing unit 306 may be configured to process the data captured by sensor 140. The data captured are indicative of objects surrounding vehicle 100 as it travels along a path, such as a street. In some embodiments, data processing unit 306 may detect objects from digital images captured by a high-definition camera. For example, FIG. 4 illustrates detecting objects based on an exemplary image 410, according to embodiments of the disclosure. Image 410 may be a digital image captured by the camera. Consistent with the present disclosure, various image processing methods may be used to detect the objects, such as image segmentation, image registration, pattern recognition, classification, etc. After processing, image 410 may be segmented and various objects may be detected, such as vehicles, street lights, trees, etc. as shown in a detection result 420.

Figure 5:
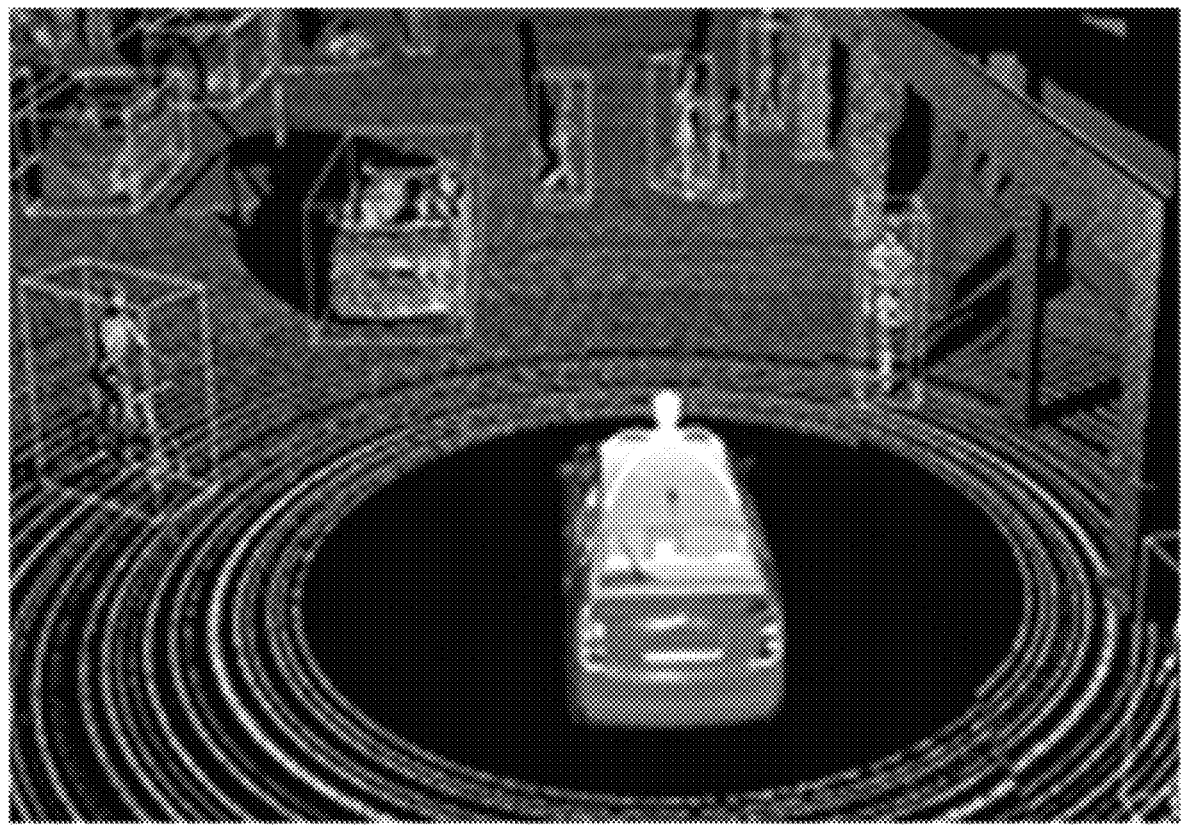
FIG. 5 illustrates detecting objects based on an exemplary point cloud, according to embodiments of the disclosure.

Data processing unit 306 may be further configured to detect objects from point clouds captured by the LiDAR. For example, FIG. 5 illustrates detecting objects based on an exemplary point cloud 500, according to embodiments of the disclosure. Point cloud 500 may contain a set of data points on the external surfaces of objects around it. A point cloud can be processed to construct a 3-D model of the objects. For example, as shown in FIG. 5, objects such as vehicles, pedestrians, and buildings are constructed out of point cloud 500. In some embodiments, machine learning can be applied to automatically recognize the objects. A suitable learning method may be used, such as supervised learning, semi-supervised learning, or unsupervised learning. In some embodiments, object detection may be implemented as a classification or clustering problem using machine learning. In some embodiments, learning models, such as convolutional neural network (CNN), may be used. The model may be trained with sample point clouds and objects and then applied to the newly captured point clouds.

In some embodiments, data processing unit 306 may be configured to detect static objects, such as buildings, trees, traffic signs, traffic lights, lanes, and moving objects, such as vehicles and pedestrian. In some embodiments, when both digital images and point clouds are available, data processing unit 306 may integrate the data to aid the detection process. Because the image data and point cloud data are representations of the same underlying scene, they can be correlated based on time stamps and/or vehicle positions and the redundancy in data to help enhance the detection results. In one exemplary method, data processing unit 306 may first calibrate the color image from the camera with the LiDAR. The points may then be divided into several groups based on the distance from the sensor and local planes. For example, foreground objects may be separated from background objects. Data processing unit 306 may then perform clustering on the 3-D points to generate accurate region-of-interests (RoIs). The objects may be detected based on the clusters, and moving objects may be tracked among different frames.

Once the objects are detected, data processing unit 306 may pass on the detection results to mounting angle determination unit 308 for determining a suitable angle to mount sensor 140. In some embodiments, the mounting angle is determined based on what objects are present in the captured scene. For example, when the scene has mostly static objects, such as high-rise buildings, the mounting angle may be increased so that sensor 140 points higher up to capture a scene with more higher objects. Additionally, by using a larger mounting angle, the captured scene typically contains less moving objects, which typically disturb the map construction process.

As another example, if the scene contains a minimum number of moving objects or high-rise buildings, the mounting angle may be decreased so that sensor 140 points horizontally to capture frames of point clouds that substantially overlap with each other. For example, mounting angle determination unit 308 may compare the number of moving objects and high-rise buildings to a predetermined threshold. Because high-definition maps are typically constructed using methods such as Simultaneous Localization And Mapping (SLAM) method, which relies on the variation of data among frames, more overlaps in the acquired point clouds can provide more information to the SLAM algorithm, and render the algorithm more robust.

In yet another example, if the captured scene contains mostly moving objects, such as vehicles and pedestrians, valuable map information may be heavily blocked by these objects that are irrelevant to the map. For example, mounting angle determination unit 308 may determine whether the number of moving objects exceeds a predetermined threshold. In that case, mounting angle determination unit 308 may determine that adjusting the mounting angle alone may not be sufficient. Mounting angle determination unit 308 may additionally or alternatively determine that vehicle 100 should slow down or stop in order for the moving objects to move out of the scene.

Mounting angle determination unit 308 may then deliver its determination to control signal generation unit 310. Control signal generation unit 310 may be configured to generate control signals accordingly. In some embodiments, actuator control signals may be generated to cause actuator 230 to adjust sensor 140 to mounting angle 322, as determined by mounting angle determination unit 308. Additionally or alternatively, control signal generation unit 310 may generate speed control signal to cause an Engine Control Unit (ECU) 340 to reduce the speed of or to stop vehicle 100. The control signals may be transmitted to actuator 230 or ECU 340 via communication interface 302.

Memory 312 and storage 314 may include any appropriate type of mass storage provided to store any type of information that processor 304 may need to operate. Memory 312 and storage 314 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 312 and/or storage 314 may be configured to store one or more computer programs that may be executed by processor 304 to perform map data acquisition functions disclosed in this application. For example, memory 312 and/or storage 314 may be configured to store program(s) that may be executed by processor 304 to control sensor 140 to capture scene data when vehicle 100 travels along a path, and process the captured data to detect static or moving objects in the scene. Moreover, processor 304 may execute the program(s) to adjust the mounting angle of sensor 140 or otherwise adjust the operation of vehicle 100.

Memory 312 and/or storage 314 may be further configured to store information and data used by processor 304. For instance, memory 312 and/or storage 314 may be configured to store the digital images and point cloud data captured by sensor 140, the machine learning models (model parameters) used for object detection, and the feature maps and other intermediate data created during the processing. These data may be stored permanently, removed periodically, or disregarded immediately after each frame of data is processed.

Figure 6:
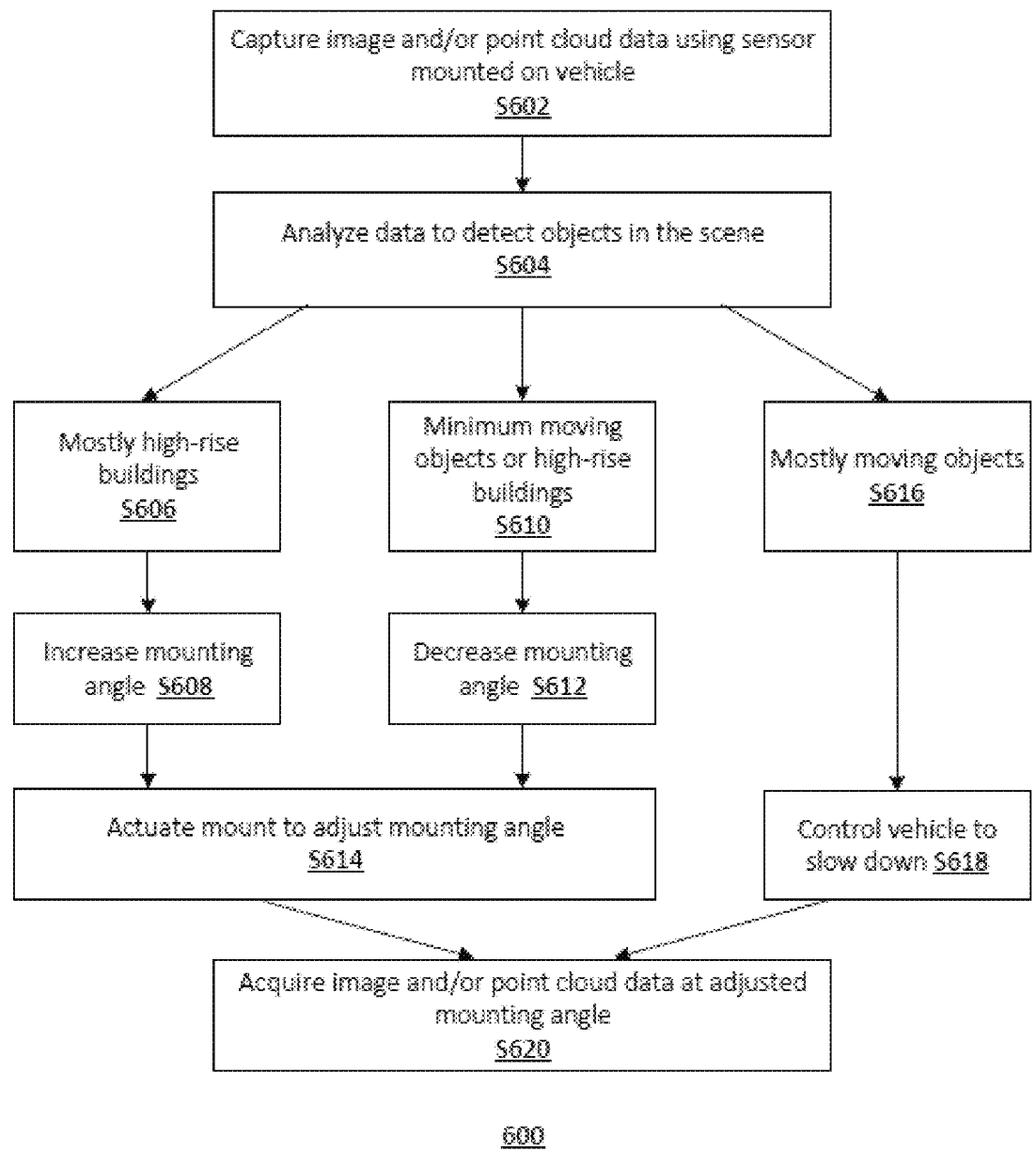
FIG. 6 illustrates a flowchart of an exemplary method for acquiring map data, according to embodiments of the disclosure.

FIG. 6 illustrates a flowchart of an exemplary method 600 for acquiring map data, according to embodiments of the disclosure. For example, method 600 may be implemented by a map data acquisition system of vehicle 100 that includes, among other things, controller 280, sensor 140, and mounting structure 130. Method 600 may include steps S602-S620 as described below.

In step S602, sensor 140 may be configured to capture scene data when vehicle 100 travels along a path, such as a street. Vehicle 100 may be a survey vehicle equipped with sensor 140, such as a LiDAR and/or a high-definition camera. Sensor 140 may be adjustably mounted to vehicle 100, where the mounting angle, among other things, is dynamically adjustable. The captured scene data contains information of objects that are present in the scene. Such objects may include static objects such as buildings, trees, traffic signs, traffic lights, street lights, lanes, etc., and moving objects such as vehicles and pedestrians on the street. The captured scene data may include digital images captured by a high-definition camera and/or point cloud data captured by a LiDAR. As vehicle 100 travels along the path, sensor 140 may continuously capture frames of scene data at different time points.

In step S604, the captured scene data may be analyzed, e.g., by controller 280 to detect objects in the scene. Scene data may be transmitted by sensor 140 to controller 280 and stored in its storage 314. Data processing unit 306 may be configured to analyze the scene data and detect the static and/or moving objects therein. In some embodiments, when the scene data contains digital images captured by a high-definition camera, various image processing methods may be used to detect the objects, such as image segmentation, image registration, pattern recognition, classification, etc. After processing, image 410 may be segmented and various objects may be detected, such as vehicles, street lights, trees, etc. as illustrated in the example shown by FIG. 4.

In some other embodiments, if the scene data contains point clouds captured by a LiDAR, data processing unit 306 may construct a 3-D model of the objects based on the point clouds, such as the example shown in FIG. 5. In some embodiments, machine learning can be applied to automatically detect the objects from the point clouds. Any suitable learning method may be used, such as supervised learning, semi-supervised learning, or unsupervised learning. In some embodiments, learning models, such as CNN, may be used. Data processing unit 306 may train the learning model in real-time with sample point clouds and objects and then apply to the newly captured point clouds. Alternatively, the learning model may be trained ahead of time using the same or a different processor. In some embodiments, when both digital images and point clouds are available, data processing unit 306 may integrate the data to enhance the detection accuracy.

Once the objects are detected, data processing unit 306 may pass on the detection results to mounting angle determination unit 308 for determining a suitable angle to mount sensor 140 or other control parameters to otherwise control vehicle 100. In some embodiments, the mounting angle is determined based on what objects are present in the captured scene. For example, in Step S606, if mounting angle determination unit 308 determines that the scene has mostly static objects, such as high-rise buildings, it may decide to increase the mounting angle so that sensor 140 points higher up to capture a scene with more higher objects and less moving objects (Step S608).

In Step S610, if mounting angle determination unit 308 determines that the scene contains a minimum number of moving objects or high-rise buildings, the mounting angle may be decreased so that sensor 140 points horizontally to capture frames of point clouds that overlap more (Step S612). For example, the number of moving objects and high-rise buildings may be compared to a predetermined threshold. More overlaps in the acquired point clouds can render the SLAM algorithm more robust and accurate.

In Step S614, control signal generation unit 310 may generate actuator control signals according to the mounting angle determined in Step S608 or S612. The control signal may be transmitted by communication interface 302 to actuator 230. Accordingly, actuator 230 may actuate pivot 131 of mounting structure 130 to turn sensor 140 to the determined mounting angle.

In Step S616, if the captured scene contains mostly moving objects, such as vehicles and pedestrians, mounting angle determination unit 308 may additionally or alternatively determine that vehicle 100 should slow down or stop in order for the moving objects to move out of the scene (Step S618). For example, mounting angle determination unit 308 may determine whether the number of moving objects exceeds a predetermined threshold. Accordingly, the control signal may be transmitted by communication interface 302 to ECU 340 to apply braking and reduce the speed of vehicle 100.

Once the mounting angle is dynamically adjusted in Step S614 or the vehicle 100 slows down or stops in Step S618, sensor 140 may be caused to continue to capture scene data at the adjusted mounting angle (Step S620).

Method 600 may be applied continuously throughout the survey process. That is, controller 280 may dynamically determine if the mounting angle should be adjusted and if so, how much it should be adjusted, based on each frame of the captured scene data or a group of adjacent frames. The mounting angle of sensor 140 is therefore dynamically and continuously adjusted, if necessary, to adaptively focus sensor 140 on a scene that contains more map information, therefore improving the quality of the later constructed high-definition map. When adjusting mounting angle no longer benefits the data acquisition, e.g., when the scene contains mostly moving objects, method 600 may control vehicle 100 to slow down or stop in order for the moving objects to be removed from the scene.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for acquiring map data, comprising:
a mounting structure configured to adjustably mount a sensor to a vehicle, wherein the sensor is configured to capture data indicative of at least one surrounding object as the vehicle travels along a path, and the sensor includes a combination of a LiDAR and a camera mounted on the same mounting structure configured to capture the data at a same angle; and
a controller, configured to:
determine whether a number of moving objects included in the captured data exceeds a predetermined threshold; and
cause the vehicle to slow down based on the number of moving objects included in the captured data exceeding the predetermined threshold;
dynamically determine a mounting angle based on the number of moving objects included in the captured data exceeding the predetermined threshold; and
cause the mounting structure to adjust the sensor according to the dynamically determined mounting angle.

2. The system of claim 1, wherein the captured data includes image data captured by the camera and point cloud data captured by the LiDAR.

3. The system of claim 1, wherein the mounting structure includes a pivot configured to turn the sensor to the dynamically determined mounting angle.

4. The system of claim 1, wherein to determine the mounting angle based on the number of moving objects included in the captured data, the controller is further configured to:
detect a group of static objects in the captured data exceeding a predetermined threshold; and
increase the mounting angle based on the detection.

5. The system of claim 4, wherein the static objects are high-rise buildings along the path in which the vehicle travels.

6. The system of claim 1, wherein the moving objects include pedestrians or other vehicles.

7. A method for acquiring map data, comprising:
capturing data indicative of at least one surrounding object using a sensor adjustably mounted on a vehicle, as the vehicle travels along a path, wherein the sensor includes a combination of a LiDAR and a camera mounted on a same mounting structure configured to capture the data at a same angle;
determining, by a controller, whether a number of moving objects included in the captured data exceeds a predetermined threshold; and
causing the vehicle to slow down based on the number of moving objects included in the captured data exceeding the predetermined threshold;
dynamically determining, by the controller, a mounting angle, for mounting the sensor on the mounting structure, based on the number of moving objects included in the captured data exceeding the predetermined threshold; and
adjusting the sensor according to the dynamically determined mounting angle.

8. The method of claim 7, wherein the captured data includes image data captured by the camera and point cloud data captured by the LiDAR.

9. The method of claim 7, wherein the sensor is mounted on the vehicle via the mounting structure that includes a pivot configured to turn the sensor to the dynamically determined mounting angle.

10. The method of claim 7, wherein determining the mounting angle based on the number of moving objects included in the captured data further includes:
detecting a group of static objects in the captured data exceeding a predetermined threshold; and
increasing the mounting angle based on the detection.

11. The method of claim 10, wherein the static objects are high-rise buildings along the path the vehicle travels.

12. The method of claim 7, wherein the moving objects include pedestrians or other vehicles.

13. A vehicle, comprising:
at least one wheel; a body carried by the at least one wheel;
a sensor configured to capture data indicative of at least one surrounding object as the vehicle travels along a path, wherein the sensor includes a combination of a LiDAR and a camera mounted on a same mounting structure configured to capture the data at a same angle;
the mounting structure configured to adjustably mount the sensor to the body; and
a controller, configured to:
determine whether a number of moving objects included in the captured data exceeds a predetermined threshold; and
cause the vehicle to slow down based on the number of moving objects included in the captured data exceeding the predetermined threshold;
dynamically determine a mounting angle based on the number of moving objects included in the captured data exceeding the predetermined threshold; and
cause the mounting structure to adjust the sensor according to the dynamically determined mounting angle.

14. The vehicle of claim 13, wherein the mounting structure includes a pivot configured to turn the sensor to the dynamically determined mounting angle.

15. The vehicle of claim 13, wherein to determine the mounting angle based on the number of moving objects included in the captured data, the controller is further configured to:
detect a group of static objects in the captured data exceeding a predetermined threshold; and
increase the mounting angle based on the detection.

16. The system of claim 1, wherein, to determine the mounting angle based on the number of moving objects included in the captured data, the controller is further configured to:
detect a minimum number of moving objects or high-rise buildings in the captured data; and
decrease the mounting angle.

17. The system of claim 1, where the captured data includes image data captured from the camera and point cloud data captured from the LiDAR in the same angle as the camera, and wherein, to determine whether the number of moving objects included in the captured data exceeds the predetermined threshold, the controller is further configured to:
  detect objects from the captured data by correlating the image data with the point cloud data based on time stamps, vehicle positions, and a redundancy between the image data and the point cloud data; and
  determine the moving objects by tracking different frames of the captured data.

* * * * *